United States Patent Office 3,504,730
Patented Apr. 7, 1970

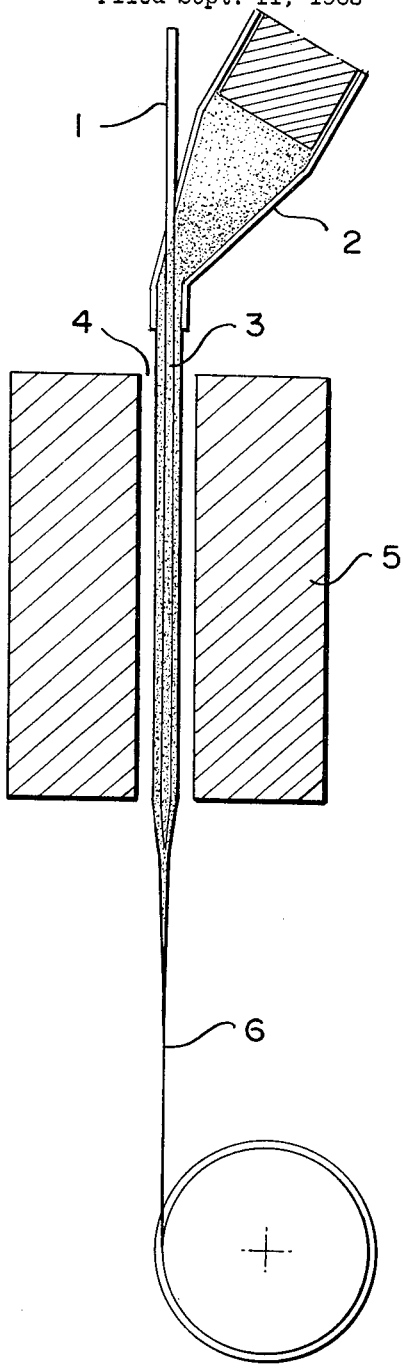

3,504,730
METHOD OF PRODUCING EXTREMELY THIN WIRES FROM HIGH-MELTING METALS OR ALLOYS
Walter Dannöhl, Wiesbadener Str. 22, Frankfurt am Main, Kelkheim-Munster, Germany
Continuation-in-part of application Ser. No. 830,679, July 30, 1959. This application Sept. 11, 1963, Ser. No. 308,621
Claims priority, application Germany, Aug. 6, 1958, D 28,697
Int. Cl. B22d 27/02
U.S. Cl. 164—50　　　　　　　　　　　　　　　7 Claims The present application is a continuation-in-part of my copending application for United States Letters Patent entitled "Process for Fabricating Very Small Wires of Metals and Metallic Alloys," Ser. No. 830,679, filed July 30, 1959, now abandoned. The invention relates to a method of producing extremely thin wires, particularly those of a diameter of under 5 microns, from high-melting metals or alloys.

It is known that ultrafine bismuth wires can be obtained by sucking liquid bismuth into a glass capillary tube, heating same to the softening temperature of the glass, considerably lengthening the glass capillary containing the liquid bismuth by catapulting and after collecting the liquid tapping the glass tube when cooled off the bismuth wire.

It is also known to apply coarse metal powder to a glass tube, then slowly passing it through a heating zone and finally drawing the heated end down to a fine capillary (U.S. Patent 1,793,529 by Taylor).

Both of these known methods need prefabricated glass tubes for enveloping. Consequently, both of the methods become uneconomical when it comes to production of thin wires from high-melting metals whose melting points are over 1200° C. as both require glass tubes or ceramic material of special make, which have high melting points. For each metal or certain groups of metals or alloys, these special glasses will have to be produced separately.

It is the invention's aim to produce fine wires from high-melting metals or alloys by most economic means.

It is a further aim of the invention to avoid the special make of capillaries from high-melting glass or ceramics.

According to the invention, the new method of producing extremely thin wires is characterized in that the basic components of the high-melting glass or ceramics are mixed to become a viscous substance as required, and the viscous substance applied under pressure to a wire having a maximum diameter of approximately 6 mm., formed from high-melting metal or alloy. The wire thus enveloped is passed through heating zones drying the pressed-on sheath at first and thereafter sintering and finally softening it and that the coated wire is drawn to a finer diameter, as already known from Taylor.

Supported by a drawing, the invention is explained hereafter in greater detail by a typical example:

An iron wire 1 of approx. 1 mm. thickness is introduced in a mold 2 and pressed by a sheath 3 of approx. 1 mm. thickness. Sheath 3 is formed from a mixture of up to 10% clay or bentonite respectively, up to 10% feldspar, up to 3% waterglass, up to 5% aluminum phosphate, less than 1% borax or boric acid, the remainder being $SiO_2$. The mixture for sheath 3 is stirred until it becomes plastic by adding water, for instance, and is then introduced into the mold 2.

Composition of the mixture is chosen in such manner that when it is heated up to 1400 and 1500° C. approx., it forms a ceramic envelope containing glassphase of considerable extent. At the melting point of iron, approx. 1525° C., the mixture still has sufficient viscosity to serve as pressing tool for the molten iron core.

In operation, raw metal wire 1 passes through nozzle 7 at the end of mold 2 in which the mixture is disposed. The mixture in mold 2 is forced through nozzle 7 in response to the forces exerted on it by press die 8 in such a manner that it forms a coating or sheath 3, which coating envelopes and adheres to wire 1. After the mixture is coated on wire 1, the coated wire is passed through hole 4 in graphite rod 5 that is heated by electric current. By passing through graphite rod 5, sheath 3 dries first, then sinters and finally becomes soft. The temperature of the coated wire within the graphite rod increases from 100° C. at the beginning to 1600 to 1800° C. at the end portion of the coal rod. At the latter temperatures, the iron wire is already molten in the softened sheath. Then the softened sheath is drawn down to a very fine capillary 6, according to the Taylor method.

Instead of using an iron wire, other metals may also be employed for wire 1 (e.g. Cobalt, Nickel, platinum). If necessary, other mixtures allowing for the essentially higher melting point of these metals must be molded. This results in a glass having a greater softening range, when sintered.

It is of importance that in the environment of the melting point of the wire material the viscosity of the wire material more rapidly decreases at increasing temperature than the viscosity of the glass or ceramic. With regard to the drawing of wire from platinum, for instance, a glass having constituent parts according to the ratio in the above recitation should be employed, with the $SiO_2$ contents being in the range of between 97 and 98%.

Instead of starting with a single metal wire it is sometimes advantageous, to employ as the wire various metals and/or alloys which are twisted or interlaced. Also, the initial wires-either all or only part of them-may have metallic or non-metallic solid sheaths or have just one overall coating. In these cases, alloying is achieved in the molten state between the components of the initial wires so that separate melting may be obviated. Alignment of the alloying contents is possible by the choice of cross-sections of the initial wire.

Moreover, the process permits further constituents to be incorporated in the thin wires via the molded sheathing. These constituents when hot are introduced by formation of alloys.

What is claimed is:

1. A method for producing extremely fine wires from initial wires or rods of high-melting metals or alloys, said wires or rods being less than 6 mm. in diameter, comprising the steps of introducing a rod of said material into a mold, enveloping said rod while it is in said mold, with a plastic sheath consisting essentially of a mixture of all materials necessary in high melting temperature glass, heating the enveloped rod to dry said sheath, thereafter heating the enveloped rod until said sheath is sintered as a glass or ceramic and becomes soft, further heating said rod to a temperature above the melting point of the metal or alloy, and drawing said sheath to a thin capillary while said metal or alloy is at a temperature above its melting point.

2. Method of producing an extremely fine iron wire comprising the steps of applying a sheath consisting of a mixture of up to 10% clay or bentonite, up to 10% feldspar, up to 3% waterglass, up to 5% aluminum phosphate, less than 1% borax, and the remainder of $SiO_2$, to an iron wire of up to 6 mm. diameter introduced in a mold, and passing said sheathed wire through thermal ducts where the sheath is first dried, thereafter sintered to become glass or ceramic and finally softened, and drawing said softened sheath to a thin capillary at temperatures above the melting point of the iron in said wire.

3. Method according to claim 2 wherein the thermal ducts are formed by a graphite rod heated by electric current, said rod heating said wire so the sheathed iron wire is slowly heated up to temperatures between 1600 and 1800° C. as the wire passes through the rod.

4. Method as claimed in claim 1 characterized in that the filament consists of various twisted wires of different metals or alloys forming metallic material.

5. Method according to claim 1 wherein the initial wire or rod consists of cobalt.

6. Method according to claim 1 wherein the initial wire or rod consists of nickel.

7. Method according to claim 1 the initial wire or rod consists of platinum and the composition of the sheath contains approx. 97% $SiO_2$.

References Cited

UNITED STATES PATENTS

| 1,793,529 | 2/1931 | Taylor | 29—423 |
| 2,359,095 | 9/1944 | Elder et al. | 72—42 |
| 2,400,866 | 5/1946 | Kronwall | 72—42 |
| 2,825,947 | 3/1958 | Goss | 22—200 |
| 3,214,805 | 11/1965 | McKenica | 29—423 |

VERLIN R. PENDEGRASS, Primary Examiner

U.S. Cl. X.R.

164—75, 86